(12) United States Patent
Pau et al.

(10) Patent No.: US 6,480,543 B1
(45) Date of Patent: Nov. 12, 2002

(54) DETECTION OF A CHANGE OF SCENE IN A MOTION ESTIMATOR OF A VIDEO ENCODER

(75) Inventors: Danilo Pau, Sesto San Giovanni (IT); Daniele Bagni, Olgiate Molgora (IT); Luca Pezzoni, Cormano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/363,135

(22) Filed: Jul. 28, 1999

(30) Foreign Application Priority Data

Aug. 6, 1998 (EP) .............................. 98830484

(51) Int. Cl.$^7$ ................................. H04B 1/66
(52) U.S. Cl. ................................. 375/240.16
(58) Field of Search ................ 375/240.16, 290.12, 375/240.18, 240.24, 290.25

(56) References Cited

U.S. PATENT DOCUMENTS

| | | | |
|---|---|---|---|
| 5,594,504 A | * 1/1997 | Ebrahimi ............... | 375/240.16 |
| 5,724,100 A | 3/1998 | Kuchibhotla ............ | 348/420 |
| 5,774,593 A | 6/1998 | Zick et al. ............. | 382/236 |
| 5,970,172 A | * 10/1999 | Mochizuki ............. | 382/233 |

FOREIGN PATENT DOCUMENTS

EP  0 705 041 A2  9/1995

OTHER PUBLICATIONS

Liu et al., "Scene Decompostion of Mpeg Compressed Video", SPIE, vol. 2419, pp. 26–37, Jul. 2, 1995.
Hsu et al., "Spatiotemporal Representation of Dynamic Objects", IEEE, pp. 14–19, Jun. 15, 1993.

* cited by examiner

Primary Examiner—Howard Britton
Assistant Examiner—Allen Wong
(74) Attorney, Agent, or Firm—Lisa K. Jorgenson; Allen, Dyer, Doppelt, Milbrath & Gilchrist, P.A.

(57) ABSTRACT

The compression and coding of digital data pertaining to video sequences of pictures including motion estimation for removing temporal redundancy are provided by recognizing the occurrence of a change of a scene to control the prediction computation of the pictures. This control is provided using a forward motion estimation for pictures preceding the change of scene, and using a backward motion estimation for pictures subsequent the change of scene of a given sequence. A change of a scene is reliably detected by checking two distinct indexes. These indexes are based on an average value of a smoothness index of the preestablished number of last processed pictures. The smoothness index of a motion field of each picture is calculated by analyzing the motion vectors for all the macroblocks of a subdivision of the picture, except for the peripheral macroblocks. Spurious detections in the event of noisy pictures, zooming and other situations that may adversely affect either one of the indexes are prevented.

18 Claims, 6 Drawing Sheets

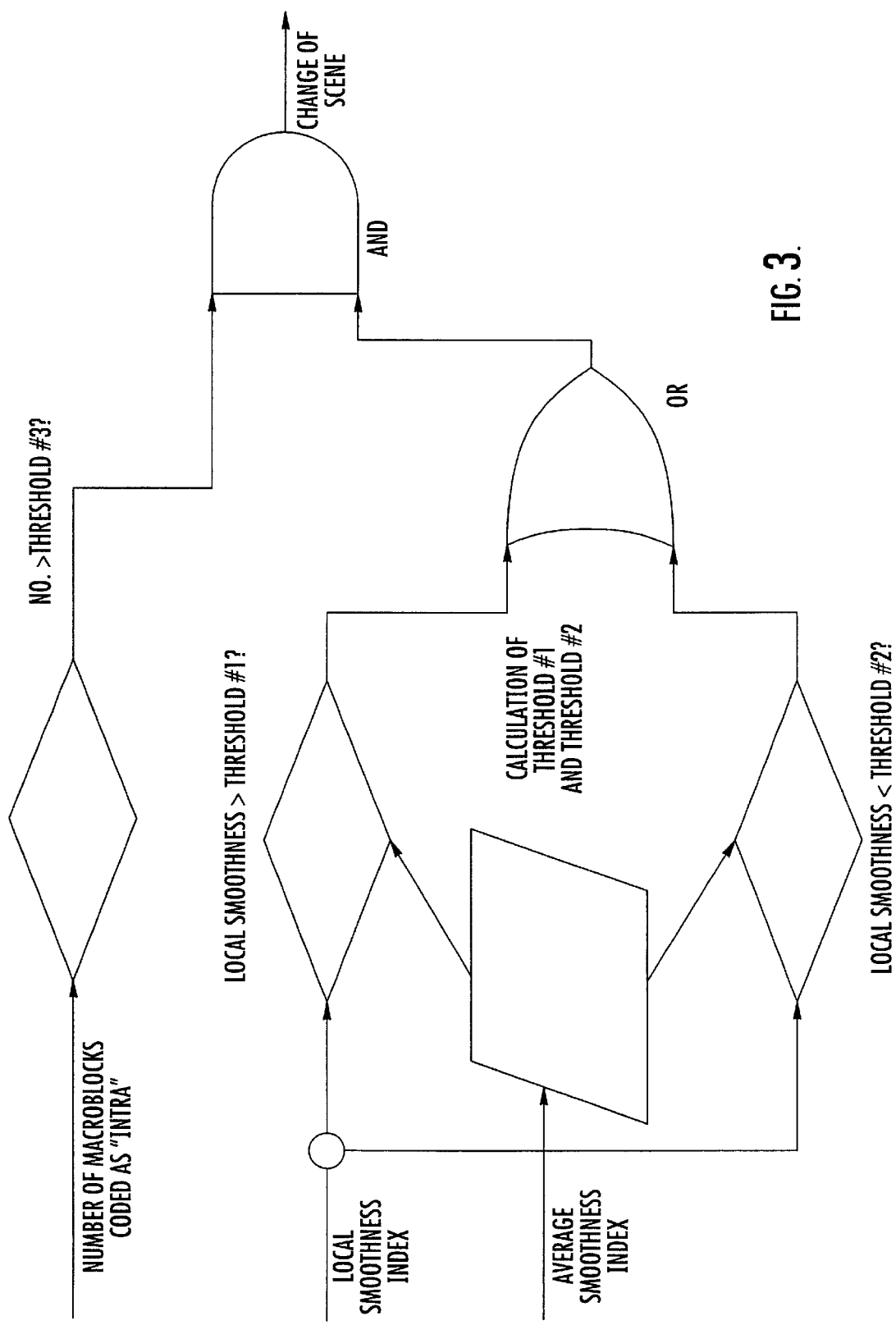

DETECTION OF A CHANGE OF SCENE IN A MOTION ESTIMATOR OF A VIDEO ENCODER

FIELD OF THE INVENTION

The invention relates to the field of electronics, and, more particularly, to a video encoder.

BACKGROUND OF THE INVENTION

Motion estimation is based upon placing a set of pixels of a certain field of a picture in a position of the same field of the successive picture. This is done by translating the preceding picture. Consequently, the transpositions of objects may expose to the video camera parts of the picture that were not visible before, as well as changes of their shape, e.g., zooming, etc.

The family of algorithms suitable to identify and associate these portions of images is generally referred to as motion estimation. Such an association permits calculation of a portion of the difference image by removing the redundant temporal information, which makes more effective the subsequent processing of the compression by DCT, quantization and entropy coding.

The MPEG-2 standard provides an example of the method as discussed above. A typical block diagram of a video MPEG-2 coder is depicted in FIG. 1. Such a system is made up of the following functional blocks.

1) Field ordinator. This block is formed of one or several field memories outputting the fields in the coding order required by the MPEG standard. For example, if the input sequence is I B B P B B P etc., the output order will be I P B B P B B . . . , where the I, P and B fields are described below.

I(Intra coded picture) is a field and/or a semifield containing temporal redundance.

P(Predicted-picture) is a field and/or semifield from which the temporal redundance with respect to the preceding I or P fields (previously co-decoded) has been removed.

B(Bidirectionally predicted-picture) is a field and/or a semifield whose temporal redundance with respect to the preceding I and subsequent P fields (or preceding P and successive P fields) has been removed. In both cases the I and P pictures must be considered as already co/decoded.

Each frame buffer in the format 4:2:0 occupies the following memory space:

| standard PAL luminance | 720 × 576 × 8 for the (Y) = 3,317,760 bit |
|---|---|
| chrominance | 360 × 288 × 8 for the (U) = 829,440 bit |
| chrominance | 360 × 288 × 8 for the (V) = 829,440 bit |
| total Y + U + V | = 4,976,640 bit |
| standard NTSC luminance | 720 × 480 × for the (Y) = 2,2764,800 bit |
| chrominance | 360 × 240 × 8 for the (U) = 691,200 bit |
| chrominance | 360 × 240 × 8 for the (V) = 691,200 bit |
| total Y + U + V | = 4,147,200 bit |

2) Motion estimator. This block removes the temporal redundance from the P and B pictures.

3) DCT. This block implements the discrete-cosine transform (DCT) according to the MPEG-2 standard. The I picture and the error pictures P and B are divided in 8*8 blocks of pixels Y, U, V on which the DCT transform is performed.

4) Quantizer Q. An 8*8 block resulting from the DCT transform is then divided by a quantizing matrix to reduce the magnitude of the DCT coefficients. The information associated with the highest frequencies less visible to human sight tends to be removed. The result is reordered and sent to the successive block.

5) Variable Length Coding (VLC). The codification words output from the quantizer tend to contain a large number of null coefficients followed by nonnull values. The null values preceding the first nonnull value are counted, and the count figure forms the first portion of a codification word. The second portion of which represents the nonnull coefficient.

These paired values tend to assume values more probable than others. The most probable ones are coded with relatively short words composed of 2, 3 or 4 bits while the least probable are coded with longer words. Statistically, the number of output bits is less than in the case that such methods are not implemented.

6) Multiplexer and Buffer. Data generated by the variable length coder, the quantizing matrices, the motion vectors and other syntactic elements are assembled for constructing the final syntax processed by the MPEG-2 standard. The resulting bit stream is stored in a memory buffer, the limit size of which is defined by the MPEG-2 standard and cannot be overfilled. The quantizer block Q supports the limit by adjusting the division of the DCT 8*8 blocks depending on the size of such a memory buffer, and on the energy of the 8*8 source block taken upstream of the motion estimation and DCT transform process.

7) Inverse Variable Length Coding (I-VLC). The variable length coding functions specified above are executed in an inverse order.

8) Inverse Quantization (IQ). The words output by the I-VLC block are reordered in the 8*8 block structure, which is multiplied by the same quantizing matrix used for its preceding coding.

9) Inverse DCT (I-DCT). The DCT transform function is inverted and applied to the 8*8 block output by the inverse quantization process. This permits changing from spatial frequency domain to the pixel domain.

10) Motion Compensation and Storage. At the output of the I-DCT block the following may alternatively be present. A decoded I picture (or semipicture) be stored in a respective memory buffer for removing the temporal redundance with respect thereto from subsequent P and B pictures. A decoded prediction error picture (semipicture) P or B that must be summed to the information removed previously during the motion estimation phase. In case of a P picture, such a resulting sum stored in a dedicated memory buffer is used during the motion estimation process for the successive P pictures and B pictures. These field memories are generally distinct from the field memories that are used for re-arranging the blocks.

11) Display Unit. This unit converts the pictures from the format 4:2:0 to the format 4:2:2, and generates the interlaced format for displaying the images. The functional blocks depicted in FIG. 1 are provided in an architecture implementing the above described coder, as shown in FIG. 2a. The field ordinator block, the motion compensation and storage block for storing the already reconstructed P and I pictures, and the multiplexer and buffer blocks for storing the bitstream produced by the MPEG-2 coding are integrated in memory devices external to the integrated circuit forming the core of the coder. The decoder accesses the external memory (DRAM) through a single interface managed by an integrated controller.

Moreover, the preprocessing block converts the received images from the format 4:2:2 to the format 4:2:0 by filtering and subsampling the chrominance. The post-processing block implements a reverse function during the decoding and displaying phase of the images. The coding phase also uses a decoding step for generating the reference pictures to make the motion estimation operative. For example, the first I picture is coded, then it is decoded and stored as described above. The first I picture is used for calculating the prediction error that will be used to code the subsequent P and B pictures.

The playback phase of the data stream previously generated by the coding process uses only the inverse functional blocks (I-VLC, I-Q, I-DCT, etc.) and not the direct functional blocks. In other words, the coding and the decoding implemented for the subsequent displaying of the images are nonconcurrent processes within the integrated architecture. The purpose or performance of the motion algorithm estimation is that of predicting images/semifields in a sequence. These sequences are obtained as a composition of whole pixel blocks referred to as predictors, which are originated from preceding or future images/semifields.

The MPEG-2 standard includes three types of pictures/semifields:

I pictures (Intra coded picture) are pictures that are not submitted to motion estimation. They contain temporal redundancy and are fundamental for the picture coding of the other two types.

P pictures (predicted picture) are the pictures whose temporal redundancy has been removed through the motion estimation with respect to the I or P pictures preceding them.

B pictures (Bidirectionally predicted picture) are the pictures whose temporal redundancy has been removed through the motion estimation with respect to the I and P pictures preceding them and/or those that are to follow.

According to an exhaustive-search motion estimator, the process is as follows. P field or semifield: Two fields of a picture are considered: Q1 at the instant t and the subsequent field Q2 at the instant t+(kp)*T. The same applies to the semifields. The term kp is a constant dependent on the number of B fields existing between the preceding I and the subsequent P (or between two P), and T is the field period of ½5 sec. for the PAL standard and ⅓0 sec. for the NTSC standard. Q1 and Q2 are formed by luminance and chrominance components. Assume that the motion estimation is applied only to the most energetic and, therefore, richer information components such as the luminance. The luminance can be represented as a matrix of N lines and M columns. Q1 and Q2 are divided into portions called macroblocks, each having R lines and S columns.

The results of the divisions N/R and M/S must be two integer numbers, but not necessarily equal to each other. Mb2(i,j) is a macroblock defined as the reference macroblock belonging to the field Q2 whose first pixel in the top left part thereof is at the intersection between the i-th line and the j-th column. The pair (i,j) is characterized by the fact that i and j are integer multiples of R and S, respectively.

FIG. 2b shows how the reference macroblock is positioned on the Q2 picture, while the horizontal dash line arrows indicate the scanning order used for identifying the various macroblocks on Q2. MB2(i,j) may be projected on the Q1 field to obtain MB1(i,j). A search window is defined on Q1 having its center at (i,j) and includes the macroblocks MBk[e,f], where k is the macroblock index. The k-th macroblock is identified by the coordinates (e,f), such that $-p<=(e-i)<=+p$, and $-q<=(f-j)<=+q$. The indexes e and f are integer numbers.

Each macroblock is a possible predictor of MB2(i,j). The various motion estimation algorithms differ from each other depending on the way the predictors are searched and selected in the search window. The predictor that minimizes a certain cost function is chosen among the whole set of possible predictors. Such a function may vary according to the selected motion estimation algorithm. For example, in the case of the MPEG-2 standard, the predictor that minimizes the L1 norm with respect to the reference macroblock is searched. This norm is equal to the sum of the absolute values of the differences among common pixels belonging to MB2(i,j) and to Mbk(e,f), respectively. R*S values contribute to each sum, the resulting value of which is called distortion.

The predictor most similar to MB2(i,j) is now identified by the coordinates of the prevailing predictor at the end of the motion estimation step. The vector formed by the components resulting from the difference between the position of the prevailing predictor and MB2(i,j) is referred to as the motion vector. This describes how MB2(i,j) is derived from a translation of a similar macroblock in the preceding field.

B field or semifield. Three fields of a picture are considered: $Qp_{n-1}$ at the instant t, $QBk_B$ at the instant $t+(k_B)*T$ and $QP_n$ at the instant $t+(k_p)*T$. The variables $k_p$ and $k_B$ are dependent on the preselected number of B fields. The same may be applied also to semifields. T is the field period, which is ½5 sec. for the PAL standard and ⅓0 sec. for the NTSC standard. $Qp_{n-1}$, $QBk_B$ and $QP_n$ are formed by luminance and chrominance components. Assume that the motion estimations are only applied to the most energetic and, therefore, richer of information components. These components include luminance, which is represented as a matrix of N lines and M columns. $QP_{n-1}$, $QBk_B$ and $QP_n$ are divided in portions called macroblocks, each having R lines and S columns.

The results of the divisions N/R and M/S must be two integer numbers, but not necessarily equal. Assume MB2(i,j) is a macroblock defined as the reference macroblock belonging to the field Q2. The first pixel of this macroblock is in the top left part thereof at the intersection between the i-th line and the j-th-column. The pair (i,j) is characterized by the fact that i and j are integer multiples of R and S, respectively.

Assume that the projection of MB2(i,j) on the $Qp_{n-1}$ field, MB1(i,j) is obtained and assume that for the projection of MB2(i,j) on the $Qp_n$ field, MB3(i,j) is obtained. A search window is defined on $QP_{n-1}$ with its center at (i,j), and includes the macroblocks MB1k[e,f]. On $QP_n$ a similar search window whose dimension may be different, or in any case predefined, is made up by MB3k[e,f]. The variable k is the macroblock index. The k-th macroblock on the $QP_{n-1}$ field is identified by the coordinates (e,f), such that $-p<=(e-i)<=+p1$, and $-q1<=(f-j)<=+q1$. The k-th macroblock on the $QP_n$ field is identified by the coordinates (e,f) such that $-p3<=(e-i)<=+p3$, and $-q3<=(f-j)<=+q3$. The indexes e and f are integer numbers.

Each of the macroblocks are a predictor of MB2(i,j). Consequently, there are in this case two types of predictors for MB2(i,j). The first type are those obtained on the field that temporally precedes the one containing the block to be estimated (I or P). These are referred to as forward predictors. The second type are those that are obtained on the field that temporally follows the one containing the block to be estimated (I or P). These are referred to as backward predictors.

Among the predictors belonging to the two sets of possible predictors, two predictors are selected. One is a backward predictor, and one is a forward predictor. These minimize a certain cost function of the hardware implementation. These sets depend on the type of motion estimation algorithm in use. This function may vary depending on the type of motion estimation that is chosen. For example, if the MPEG-2 standard is chosen, the predictor that minimizes the L1 norm with respect to the reference macroblock is searched. Such a norm is equal to the sum of absolute values of the differences among common pixels belonging to MB2(i,j) and MB1k(e,f) onto MB3k(e,f), respectively. The R*S values contribute to each sum whose result is called distortion.

A certain number of forward distortion values are obtained among which the lowest is chosen. This is done by identifying a prevailing position $(e_f, f_f)$ on the field $QP_{n-1}$, and a certain number of backward distortion values among which again the lowest value is chosen by identifying a new prevailing position $(e_b, f_b)$ on the $Qp_n$ field. Moreover, the distortion value between MB2(i,j) and a theoretical macroblock obtained by linear interpolation of the two prevailing predictors is calculated.

MB2(i,j) may be estimated by using three types of macroblocks: the forward predictor $(e_f, f_f)$, the backward predictor $(e_b, f_b)$ or an average of both. The vector formed by the difference components are defined as the motion vectors and describe how MB2(i,j) derives from a translation of a macroblock similar to it in the preceding field and/or in the successive field. The difference components are between the position of the prevailing predictor(s) and MB2(i,j)

An exhaustive search motion estimator and a hierarchical recursive motion estimator are described in European Patent Application No. 98830163.6, which is assigned to the assignee of the present invention. The known motion estimators perform a motion estimate by considering in a linear way the pictures from the first of a certain sequence to the last of the sequence. During the sequence, changes of a scene occur at some points of the picture. The motion estimation process carried out by known estimators attempts to predict the picture with respect to preceding and/or to the successive picture even though they belong now to different scenes and are therefore largely uncorrelated to the picture under estimation. As a result of this, the predicted picture inevitably will contain blocks of pixels that belong to a different scene. This causes a significant drawback, and undesirably reduces the performance that may be obtained from known motion estimators when changes in a scene occur during a sequence of video images.

SUMMARY OF THE INVENTION

The above described drawbacks and disadvantages of the known motion estimators are overcome by the present invention by providing a motion estimation algorithm for coding systems of video pictures in which reference fields (intra coded pictures) are generated and stored to be used for dynamically calculating the prediction error in coding successive P and/or B pictures. P pictures are the predicted pictures and B pictures are the bidirectionally predicted pictures. The temporal redundance is removed through the motion estimation with respect to preceding I or P pictures for P pictures, or preceding and/or successive I or P pictures for B pictures.

The method of the invention is based on identifying an occurred change of a scene by monitoring certain parameters on a certain number of pictures temporally in sequence. An assertion signal of an occurred change of the scene is used to limit the use of the forward motion estimation for images preceding the change of scene. The assertion signal of an occurred change of the scene is also used to limit the backward estimation for pictures following the change of scene between two Intra pictures.

The method for motion estimation from successive picture fields for coding systems of video pictures includes decoding of pictures by utilizing stored reference pictures (Intra coded pictures) used to dynamically calculate a prediction error for coding successive pictures (Predicted picture and Bidirectionally predicted pictures). The temporal redundance is removed through a motion estimation with respect to preceding I or P pictures (Predicted pictures) or preceding them and/or following them (Bidirectionally predicted picture). This is carried out by macroblocks of pixels in which the pictures are divided.

The method preferably includes the steps of defining and calculating a smoothness index of a motion field of each picture by analyzing the motion vectors for all the macroblocks of a subdivision of the picture, except are the peripheral macroblocks. The method further includes calculating the average smoothness index for a certain preestablished number of last processed pictures, monitoring the number of macroblocks belonging to the same picture that are coded as intra macroblocks, and identifying a change of scene from a combination of the number of macroblocks belonging to the same picture coded as higher intra compared to a certain threshold number and/or of the variation of the smoothness index of two successive pictures compared to a top and a bottom threshold.

This threshold is based on the average value of the smoothness index of the preestablished number of last processed pictures. The method preferably further includes the step of using the identification of a change of scene to command the prediction computation of the pictures using only a forward motion estimation for pictures preceding the change of scene, and using only a backward motion estimation for picture subsequent the change of scene.

BRIEF DESCRIPTION OF THE DRAWINGS

FIG. 3 represents a procedure for detecting a change of scene, according to the present invention.

DETAILED DESCRIPTION OF THE PREFERRED EMBODIMENTS

As discussed above, the motion estimation algorithms identify one or more predictors and one or more motion vectors for each macroblock belonging to the image to be predicted, thus generating a motion field. In describing the method of the invention, reference will be made to a set of field of numbers equal to the temporal distance between two successive fields of P or I type. The temporal distance was previously fixed to be equal to M. Therefore, a total number of fields equal to M+2 will be considered altogether.

Figure 1:
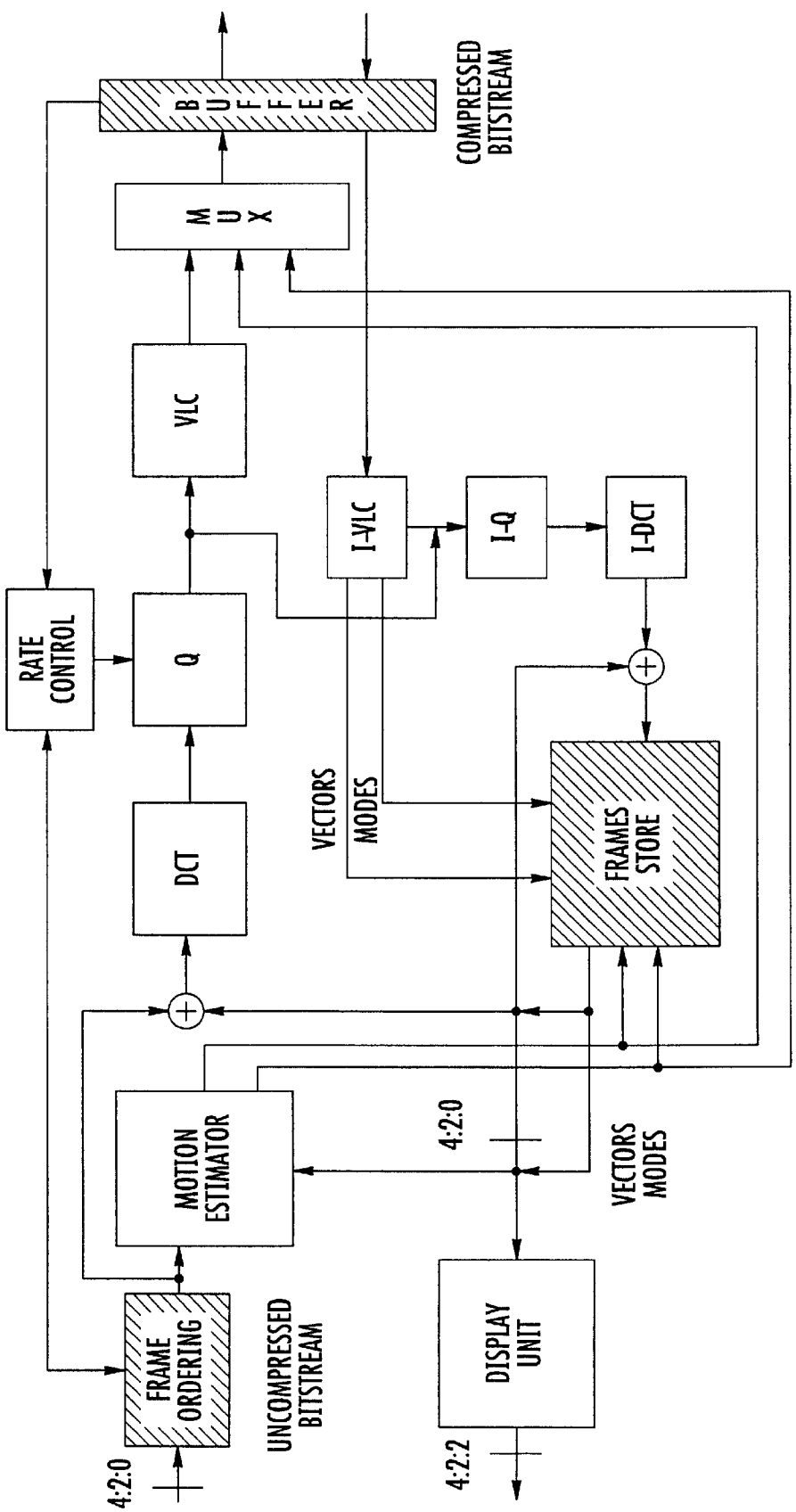
FIG. 1 is a functional scheme of a MPEG-2 video coder including a motion estimator block, according to the prior art.
Figure 2A:
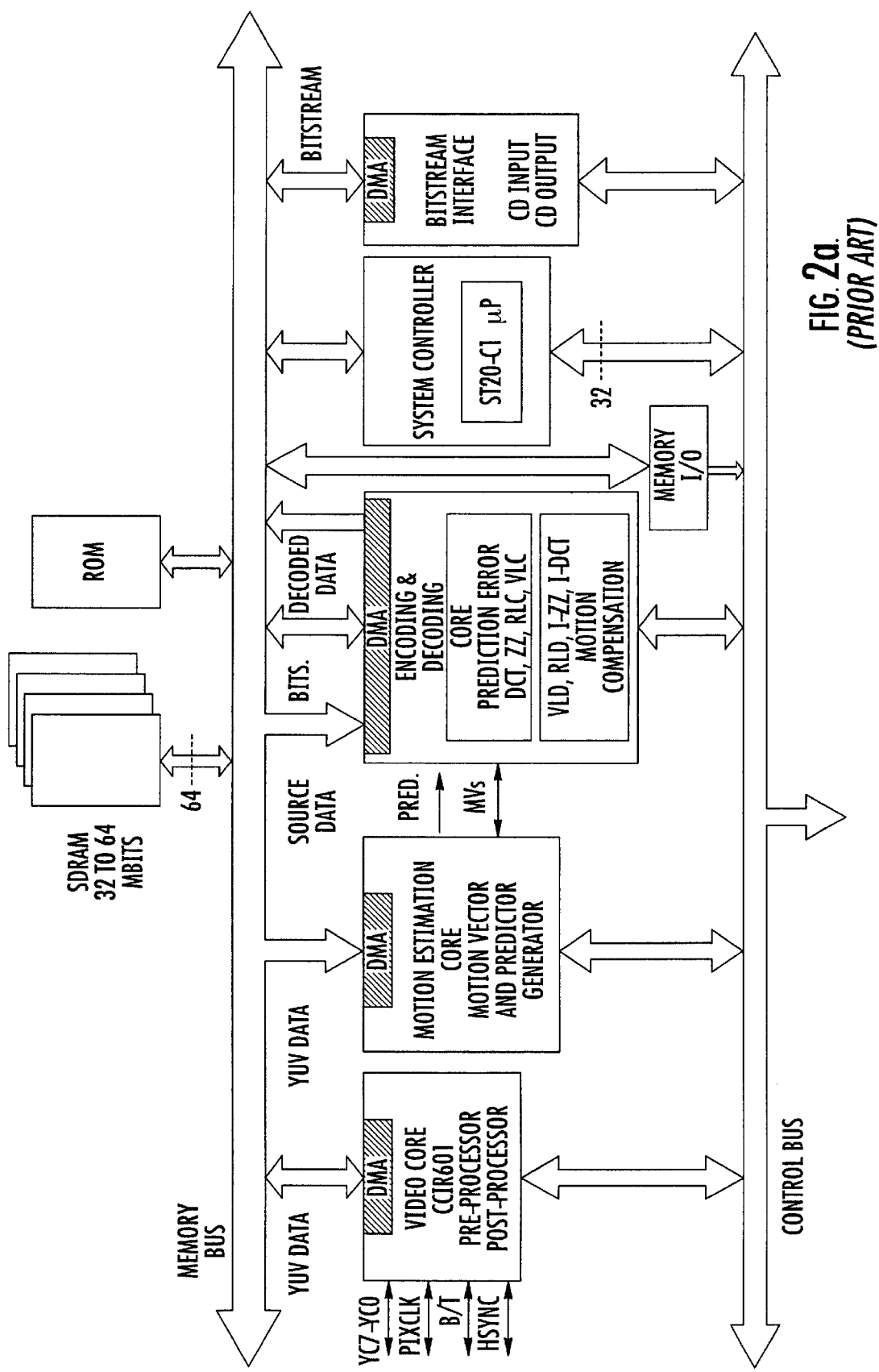
FIG. 2a shows the architecture of the MPEG-2 coder of FIG. 1, according to the prior art.
Figure 2B:
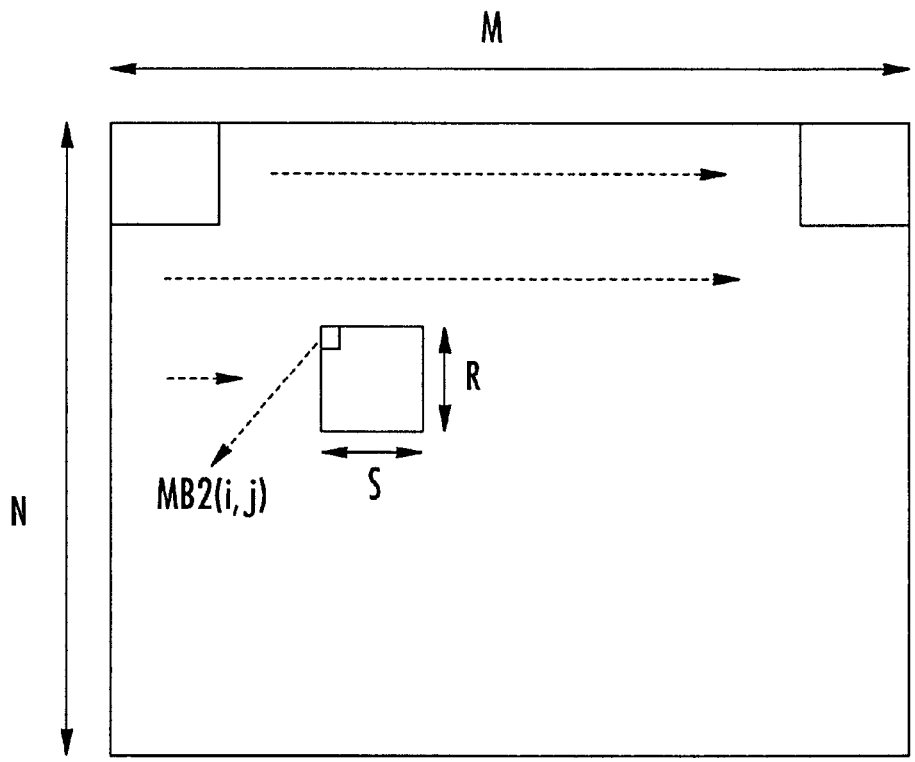
FIG. 2b shows the position of a macroblock taken on a certain Q2 picture with the horizontal dash arrow lines indicating the scanning order, according to the prior art.
Figure 2C:
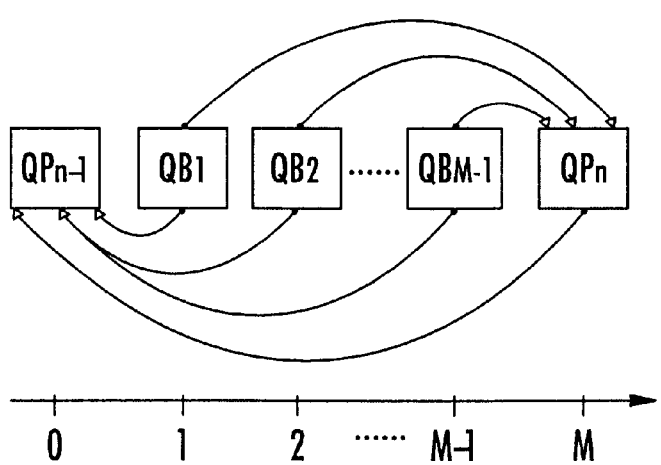
FIG. 2c shows the normal mechanism of motion estimation performed on a certain number of pictures, according to the prior art.

Assume that the temporal distance between two successive pictures is equal to a field period, and the M+2 pictures have already been motion estimated for obtaining their respective motion fields. If no change of scene has occurred in this sequence of pictures, the estimation is as depicted in FIG. 2c.

Figure 2D:
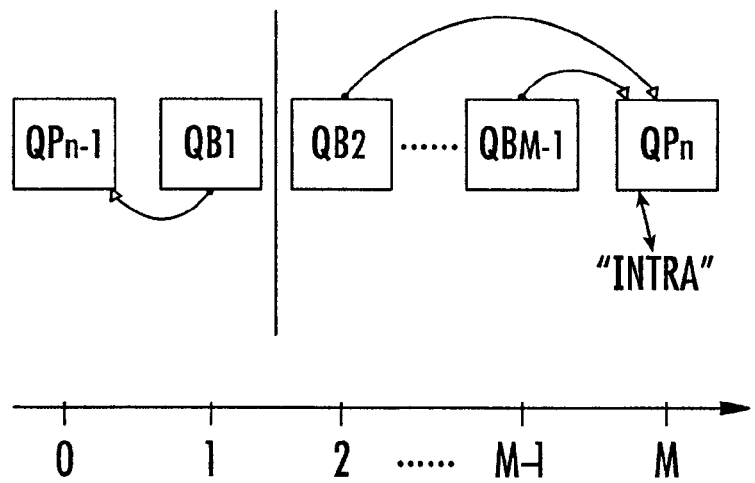
FIG. 2d shows a modified mechanism of motion estimation considering an occurred change of scene between the $QB_1$ and $QB_2$ pictures, according to the present invention.

However, if a change of scene had occurred, for example, between $QB_1$ and $QB_2$, then the estimation should advantageously occur as depicted in FIG. 2d. Since the picture $QB_1$ pertains to the scene to which $QP_n$ belongs, then $QB_1$ must be predicted only by $QP_{n-1}$ and not by $QP_n$ which belongs to another scene. The same stands also for $QB_2$ and $QB_{M-1}$, which must be predicted only with respect to $QP_n$ and not to $Qp_{n-1}$. This cannot be applied to $QP_n$, which is the base for the prediction of the successive and/or preceding pictures and is not being predicted with respect to $QP_{n-1}$. $QP_n$ must contain macroblocks all coded as intra, thus becoming an I picture. Therefore, a precise identification of the changes of scene is of great importance to provide a correct pictures prediction.

The method of the invention exploits the correlation that exists among motion vectors belonging to nearby macroblocks. If in a sequence there is no change of scene, the motion estimation algorithm generates ordered motion fields because they determine a real translation of objects among the various pictures. All the macroblocks of pixels that form the object will shift in the same direction altogether and, therefore, will have equal motion vectors.

However, if a change of scene occurs, the motion estimation algorithm generates uncorrelated motion fields because they do not determine a real movement of the objects. Indeed, the algorithms attempt to determine the translation of all the elements contained in the picture with respect to pictures that belong to other scenes, and which are likely not to contain them at all. All the macroblocks of pixels making up the object will have uncorrelated motion vectors. Each vector having a direction and a value different from the others. This situation will produce an unsatisfactory motion estimation and many macroblocks will be coded as intra (I-picture).

To determine the validity of the translation vectors determined by the algorithm of motion estimation, an index of arrangement of the picture motion field, called smoothness is introduced. The smoothness index is defined by the following expressions:

$$s(t) = \sum_x \sum_h \frac{|\Delta Xh| + |\Delta Yh|}{4 * Nb}$$

Figure 2E:
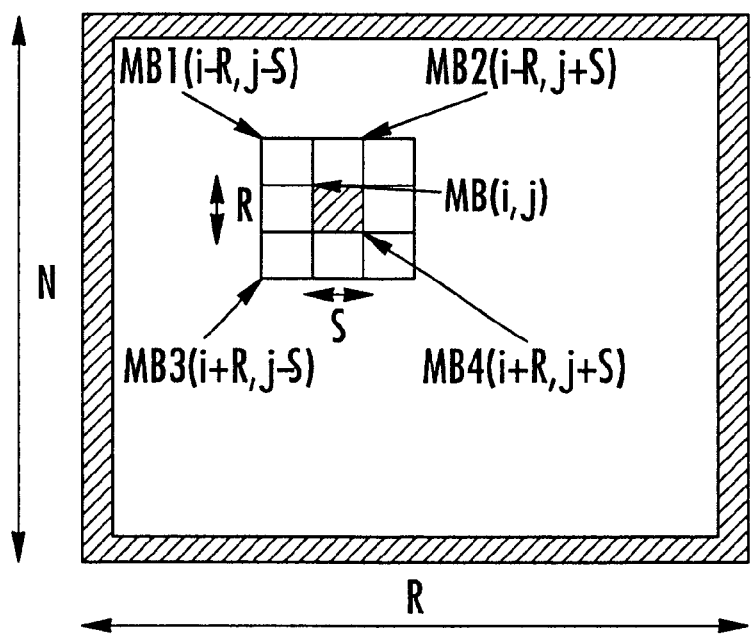
FIG. 2e shows the relative position of macroblocks (nonperipheral) that are considered in establishing a smoothness index, according to the present invention.

$\Delta Xh = mv\_MB(i,j)x - mv\_MBh(i \pm R, j \pm S)x$ $\Delta Yh = mv\_MB(i,j)y - mv\_MBh(i \pm R, j \pm S)y$ Where:
mv_MB(. , .) is the motion vector associated to the macroblock MB (. , .);

the index X of the sum signifies that it is extended to all macroblocks of the picture under consideration with the exception of the peripheral ones.

x and $\Delta y$ are the differences of the motion vector coordinates between the actual macroblock MB(i, j) and one of the macroblocks MB(. , .), as shown in FIG. 2e;

The index h (h=1, 2, 3, 4) signifies that $\Delta x$ and $\Delta y$ between MB(i, j) and each of the four Mbh(. , .) are calculated; and Nb is the number of macroblocks contained in the picture, excluding the peripheral ones.

The change of scene is determined according to the scheme of FIG. 3 by combining two factors. The first factor is a high number of macroblocks of a field or picture being processed coded as intra, and greater than a certain threshold number determined through statistical considerations. The second factor is a variation of the smoothness index with respect to two thresholds, which are both referred to as the average smoothness index of the last pictures. These thresholds are also derived from statistical considerations.

Upon a simultaneous occurrence of these two conditions, a change of scene may be reliably determined. Thereby, the maintenance of an effective motion estimation may be ensured while in presence of a change of scene. The use of at least two distinct indexes in combination has been found effective in preventing spurious recognitions of changes of scene. Even if a change of scene does not occur, it may happen that a high number of macroblocks are coded as intra in case, for example, the pictures are effected by noise. In a situation like this, use of the smoothness index in addition to the macroblocks coded as intra provides an effective discrimination. Similarly, in case of zooming the smoothness index would increase but not significantly as the number of intra coded macroblocks would increase.

Figure 4:
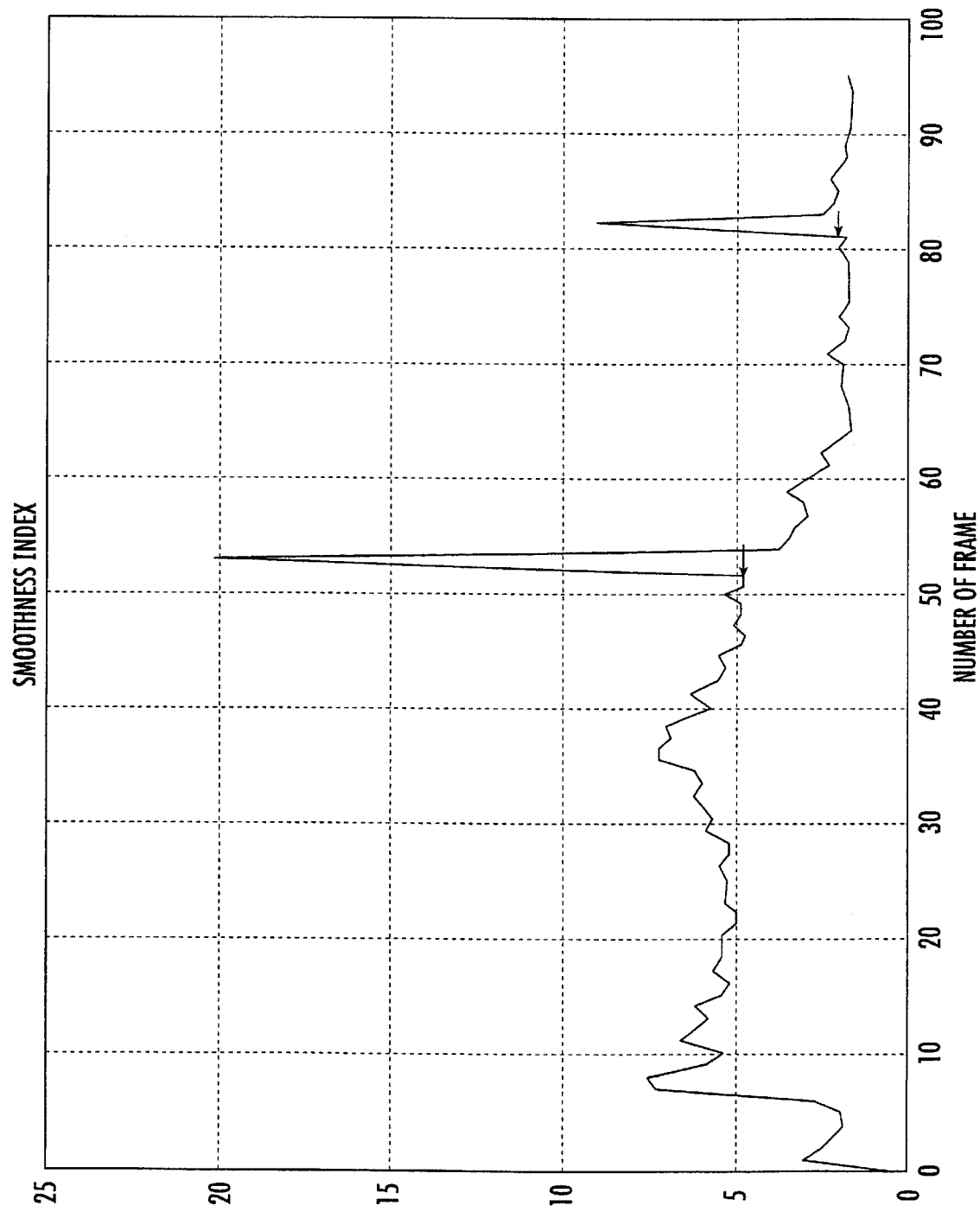
FIG. 4 shows a graph depicting the smoothness index for a typical sequence of pictures during a table tennis play, according to the present invention.

FIG. 4 depicts the smoothness index for a table tennis play sequence presenting two changes of scene and one zoom. The two changes of scene coincide with the two points indicated by the arrows, and the smoothness index has a significant peak while remaining approximately constant for the rest of the sequence. The zoom coincides with frame number 6 and the smoothness index increments at this point which could be erroneously interpreted as if there had been a change of scene. However, since the number of macroblocks coded as intra remains low, such an erroneous interpretation is avoided.

FIG. 4 also illustrates the importance of the calculation of the above cited smoothness thresholds based on an average smoothness value of the last pictures. The frames from number 10 to number 52 have an average smoothness index higher than that of the other frames of the sequence. The algorithm that determines the change of scene is the following:

calculation among all the macroblocks of the picture, with the exclusion of those of the outer crown of the picture, of a local smoothness index (=local_smooth);

calculation of the number of macroblocks coded as INTRA (=number_of_intra);

calculation of the average smoothness index of the last 4 (as an example) pictures (=average_smooth)

threshold1=average_smooth*$\alpha$, threshold2=average_smooth*$\beta$, threshold3=number_of_intra*X, where $\alpha$, $\beta$ and X are numerical coefficients;

if ((number-of-intra>threshold3) and ((local_smooth>threshold1) or (local_smooth<threshold2)))
then—>change of scene,
else—>no change of scene.

The usefulness of the method of the invention increases when algorithms of motion estimation implement successive steps for processing. For example, this usefulness is increased in the hierarchical estimator and in the recursive hierarchical estimator described in the above referenced European Patent Application. Identification of an intervening change of scene may be performed at an intermediate point of the step noise estimation algorithm. The result may be used to condition the successive steps of the motion estimation algorithm for an overall optimization.

The invention is particularly suited for a recursive hierarchical estimator because it produces a particularly coherent motion vector field. The emphasized correlation among the translation vectors relative to adjacent macroblocks makes even more reliable the method of the invention for timely detecting a change of a scene.

That which is claimed is:

1. A method of motion estimation from successive picture fields for a video picture coding system comprising decoding of pictures by utilizing stored reference pictures (I pictures) to calculate a prediction error for coding successive pictures (P and B pictures) wherefrom temporal redundance is removed through a motion estimation with respect to pictures preceding the reference or successive pictures (I or P pictures) or preceding them and/or following them (B pictures) carried out by macroblocks of pixels in which the pictures are divided, the method comprising the steps of:

defining and calculating a smoothness index of a motion field of each picture by analyzing motion vectors of all the macroblocks in which the picture is divided, with an exception of peripheral macroblocks;

calculating an average smoothness index for a preestablished number of last processed pictures;

monitoring a number of macroblocks belonging to a same picture coded as intra macroblocks;

identifying a change of a scene from a combination of the number of macroblocks belonging to the same picture coded as higher intra compared to a threshold number and/or of a variation of the smoothness index of two successive pictures compared to a top and a bottom threshold based on the average value of the smoothness index of the preestablished number of last processed pictures; and using identification of the change of the scene to control prediction computation of pictures using only a forward motion estimation for pictures preceding the change of the scene, and using only a backward motion estimation for pictures subsequent the change of the scene.

2. A method according to claim 1, wherein the smoothness index is defined as:

$$s(t) = \sum_x \sum_h \frac{|\Delta Xh| + |\Delta Yh|}{4 * Nb}$$

where:

$\Delta Xh = mv\_MB(i, j)x - mv\_MBh(i \pm R, j \pm S)x$ $\Delta Yh = mv\_MB(i, j)y - mv\_MBh(i \pm R, j \pm S)y$ mv_MB(. , .) is a motion vector associated to the macroblock MB (. , .);

index X of a sum signifies that the sum is extended to all the macroblocks of the picture being processed with the exception of the peripheral ones;

x and $\Delta$y are the differences of the motion vector coordinates between an actual macroblock MB(i, j) and one of the macroblocks MB(. , .);

index h (h=1, 2, 3, 4) identifying an other one of the macroblocks; and

Nb is a total number of macroblocks contained in the picture excluding the peripheral ones.

3. A method according to claim 1, wherein the video picture coding system conforms to the MPEG-2 standard.

4. A method according to claim 1, wherein generation of the motion vector is applicable to an SPML compressed video sequence of a PAL type.

5. A method according to claim 1, wherein generation of the motion vector is applicable to an SPML compressed video sequence of an NTSC type.

6. A method of motion estimation from successive picture fields for a video picture coding system comprising decoding of pictures wherefrom temporal redundance is removed through a motion estimation carried out by macroblocks of pixels in which the pictures are divided, the method comprising the steps of:

defining and calculating a smoothness index of a motion field of each picture by analyzing motion vectors of all the macroblocks in which the picture is divided, with an exception of peripheral macroblocks;

calculating an average smoothness index for a preestablished number of last processed pictures;

monitoring a number of macroblocks belonging to a same picture coded as intra macroblocks;

identifying a change of a scene from a combination of the number of macroblocks belonging to the same picture coded as higher intra compared to a threshold number and/or of a variation of the smoothness index of two successive pictures compared to a top and a bottom threshold based on the average value of the smoothness index of the preestablished number of last processed pictures; and using identification of the change of the scene to control prediction computation of pictures using only a forward motion estimation for pictures preceding the change of the scene, and using only a backward motion estimation for pictures subsequent the change of the scene.

7. A method according to claim 6, wherein the decoding of pictures by the video picture coding system is performed by utilizing stored reference pictures (I pictures) to calculate a prediction error for coding successive pictures (P and B pictures).

8. A method according to claim 7, wherein the motion estimation by the video picture coding system is performed with respect to pictures preceding reference or successive pictures (I or P pictures) or preceding them and/or following them (B pictures).

9. A method according to claim 6, wherein said smoothness index is defined as:

$$s(t) = \sum_x \sum_h \frac{|\Delta Xh| + |\Delta Yh|}{4 * Nb}$$

where:

$\Delta Xh = mv\_MB(i, j)x - mv\_MBh(i \pm R, j \pm S)x$ $\Delta Yh = mv\_MB(i, j)y - mv\_MBh(i \pm R, j \pm S)y$ mv_MB(. , .) is a motion vector associated to the macroblock MB (. , .);

index X of a sum signifies that the sum is extended to all the macroblocks of the picture being processed with the exception of the peripheral ones;

x and Δy are the differences of the motion vector coordinates between an actual macroblock MB(i, j) and one of the macroblocks MB(. , .);

index h (h=1, 2, 3, 4) identifying an other one of the macroblocks; and

Nb is a total number of macroblocks contained in the picture excluding the peripheral ones.

10. A method according to claim 6, wherein the video picture coding system conforms to the MPEG-2 standard.

11. A method according to claim 6, wherein generation of the motion vector is applicable to an SPML compressed video sequence of a PAL type.

12. A method according to claim 6, wherein generation of the motion vector is applicable to an SPML compressed video sequence of an NTSC type.

13. An MPEG encoder comprising:

a motion estimation system for common fields of successive pictures, said motion estimation system comprising an algorithm of motion estimation responsive to identification of an intervened change of a scene, said algorithm for causing said motion estimation system to perform the steps of:

defining and calculating a smoothness index of a motion field of each picture by analyzing motion vectors of all the macroblocks in which the picture is divided, with an exception of peripheral macroblocks, calculating an average smoothness index for a preestablished number of last processed pictures, monitoring a number of macroblocks belonging to a same picture coded as intra macroblocks, identifying a change of a scene from a combination of the number of macroblocks belonging to the same picture coded as higher intra compared to a threshold number and/or of a variation of the smoothness index of two successive pictures compared to a top and a bottom threshold based on the average value of the smoothness index of the preestablished number of last processed pictures, and using identification of the change of the scene to control prediction computation of pictures using only a forward motion estimation for pictures preceding the change of the scene, and using only a backward motion estimation for pictures subsequent the change of the scene.

14. An MPEG according to claim 13, wherein the algorithm of motion estimation is performed with respect to pictures preceding reference or successive pictures (I or P pictures) or preceding them and/or following them (B pictures).

15. An MPEG encoder according to claim 13, wherein the smoothness index is defined as:

$$s(t) = \sum_x \sum_h \frac{|\Delta Xh| + |\Delta Yh|}{4 * Nb}$$

where:

$\Delta Xh = mv\_MB(i, j)x - mv\_MBh(i \pm R, j \pm S)x$ $\Delta Yh = mv\_MB(i, j)y - mv\_MBh(i \pm R, j \pm S)y$ mv_MB(. , .) is a motion vector associated to the macroblock MB (. , .);

index X of a sum signifies that the sum is extended to all the macroblocks of the picture being processed with the exception of the peripheral ones;

x and Δy are the differences of the motion vector coordinates between an actual macroblock MB(i, j) and one of the macroblocks MB(. , .);

index h (h=1, 2, 3, 4) identifying an other one of the macroblocks; and

Nb is a total number of macroblocks contained in the picture excluding the peripheral ones.

16. An MPEG encoder according to claim 13 conforms to the MPEG-2 standard.

17. An MPEG encoder according to claim 13, wherein generation of the motion vector is applicable to an SPML compressed video sequence of a PAL type.

18. An MPEG encoder according to claim 13, wherein generation of the motion vector is applicable to an SPML compressed video sequence of an NTSC type.

* * * * *

UNITED STATES PATENT AND TRADEMARK OFFICE
CERTIFICATE OF CORRECTION

PATENT NO. : 6,480,543 B1 Page 1 of 1
DATED : November 12, 2002
INVENTOR(S) : Danilo Pau, Daniele Bagni and Luca Pezzoni It is certified that error appears in the above-identified patent and that said Letters Patent is hereby corrected as shown below:

Column 1,
Line 57, delete "720 x 480 x for the" insert -- 720 x 480 x 8 for the --
Line 58, delete "2,2764,800" insert -- 2,764,800 --

Column 2,
Line 49, delete "be stored" insert -- is stored --

Column 4,
Line 59, delete "-p" insert -- -pl --

Column 6,
Line 24, delete "except are the" insert -- except the --

Signed and Sealed this

Twenty-fourth Day of June, 2003

JAMES E. ROGAN
*Director of the United States Patent and Trademark Office*